United States Patent
Sherman, II et al.

(10) Patent No.: US 6,360,852 B1
(45) Date of Patent: Mar. 26, 2002

(54) DRUM-IN-HAT PARK BRAKE ASSEMBLY

(75) Inventors: William Eugene Sherman, II, South Bend, IN (US); Randall Michael Zonca, Livonia, MI (US); Timothy James Posey, Elkhart, IN (US); David Thomas Sadanowicz, Canton, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/629,002

(22) Filed: Jul. 31, 2000

(51) Int. Cl.$^7$ ............................................... F16D 63/00
(52) U.S. Cl. ..................... 188/70 R; 188/327; 188/341
(58) Field of Search ................................ 188/70 R, 74, 188/341, 325, 327, 343

(56) References Cited

U.S. PATENT DOCUMENTS

| | | | | |
|---|---|---|---|---|
| 3,940,159 A | * | 2/1976 | Pringle | 188/18 A |
| 5,180,037 A | * | 1/1993 | Evans | 188/70 R |
| 5,322,145 A | * | 6/1994 | Evans | 188/70 R |
| 5,715,916 A | * | 2/1998 | Fanelli et al. | 188/70 R |

FOREIGN PATENT DOCUMENTS

GB 2 032 546 A * 5/1980 ............... 188/70 R

* cited by examiner

Primary Examiner—Matthew C. Graham
Assistant Examiner—Thomas J. Williams
(74) Attorney, Agent, or Firm—Leo H. McCormick, Jr.; Warren Comstock

(57) ABSTRACT

A drum-in-hat park brake assembly having a first brake shoe retained on a backing plate by a first pin and a second brake shoe retained by a second pin. The first and second pins permit the first and second brake shoes to be moved in a radial plane and to rotate about an axis of an opening in the backing plate. The first and second brake shoes each have a first engagement end which is aligned on the backing plate by an anchor post and a second engagement end which is selectively spaced apart by an adjuster mechanism. A spring arrangement urges the first and second brake shoes toward the anchor post and into engagement with the adjuster mechanism. An actuator assembly is connected to the first engagement end of the first and second brake shoes and upon receiving an input force moves first and second friction pads associated with the first and second brake shoes into radial engagement with a drum. The radial engagement causes the first and second brake pads to rotate and bring one of the first engagement ends into contact with the anchor post. The anchor post provides resistance to the rotation of the first and second brake pads during a corresponding brake application. The anchor post is characterized by a projection that extends from a wheel bearing housing fixed to a cast knuckle for a suspension system of the vehicle to provide a direct link between a fixed support in the vehicle and the first and second pads to resist rotative torque developed through the engagement of the friction pads with the drum during a brake application.

2 Claims, 3 Drawing Sheets

DRUM-IN-HAT PARK BRAKE ASSEMBLY

This invention relates to an anchor post, defined by a projection which extends from a wheel bearing housing, for a drum-in-hat park brake to provide resistance to rotative torque developed on engagement of friction pads with a drum during a brake application.

BACKGROUND OF THE INVENTION

In most vehicles with four wheel disc brakes, the disc brake associated with the front wheel is attached to a steering knuckle assembly. The steering knuckle assembly is usually constructed as a one-piece forged or cast unit which includes a wheel bearing carrier, torque arms for supporting a disc brake caliper and points of attachment for suspension joints. In order to reduce the weight of a steering knuckle assembly is has been suggested that certain components could be stamped from steel plates. This type of steering knuckle performs in a satisfactory manner and is disclosed in the prior art of which U.S. Pat. Nos. 3,940,159 and 4,518,159 may be considered to be illustrative.

The disc brake assembly for the rear wheels for a vehicles is usually achieved by the attachment of an anchor plate to the housing of the rear axle. In this type brake the anchor plate is made from a cast material and may include a support abutment for first and second brake shoes associated with a drum-in-hat emergency or park brake as disclosed in U.S. Pat. Nos. 5,180,037 and 5,865,275.

In recent years the length of some vehicles and in particular trucks, has increased to an extent that the overall ease in maneuverability such as turning a sharp corner has been reduced. In order to retain a desired control over the vehicle and yet provide an economy associated with a larger vehicle, it has been suggested that the rear wheels have the capability to be steered in coordination with the front wheels, i.e. four wheel steering. Unfortunately, the manufacture and assembly of the front wheel components and rear wheel component for a vehicle do not occur as a simultaneous function and as a result damage to the support abutment may occur in the shipping from one location to another location.

SUMMARY OF THE INVENTION

A primary object of the present invention is to replace a support abutment for a drum-in-hat park brake provided on an anchor plate for a disc brake assembly with a projection which extends from a wheel bearing housing fixed to a suspension/steering knuckle for a vehicle.

The present invention relates to a wheel bearing housing and a backing plate for a drum-in-hat brake assembly. A first brake shoe is retained on the backing plate by first pin and a second brake shoe is retained on the backing plate by a second pin. The first and second pins permit the first and second brake shoes to be moved in a radial plane and have limited rotational capability about an axis of an opening in the backing plate. The first and second brake shoes each have a first engagement end which is aligned on the backing plate by an anchor post extending from the wheel bearing housing and a second engagement end which is selectively spaced apart by an adjuster mechanism. A spring arrangement urges the first and second brake shoes toward the anchor post and into engagement with the adjuster mechanism. An actuator assembly is connected to the first engagement end of the first and second brake shoes and upon receiving an input force moves first and second friction pads associated with the first and second brake shoes into radial engagement with a drum. The radial engagement causes the first and second brake pads to rotate and bring one of the first engagement ends into contact with the anchor post. The anchor post provides resistance to the rotation of the first and second brake shoes during a corresponding brake application. The anchor post is characterized by a projection which extends from a wheel bearing housing fixed to the knuckle for a suspension system and steering linkage to provide direct link between a fixed support on the vehicle and the first and second shoes to resist rotative torque developed through the engagement of the friction pads with the drum during a brake application.

An advantage of the instant drum-in-hat park brake resides in the use of a projection that extends from the housing of a wheel bearing as a support abutment for first and second brake shoes to resist braking torque to take advantage of the high strength provided by the material composition of the bearing housing.

A further advantage of the instant drum-in-hat park brake is in the ease whereby a wheel bearing housing, first and second brake shoes, an adjuster and actuator secured to a backing plate of a drum-in-hat park brake are attached to a knuckle associated with the suspension system and steering linkage for a vehicle to allow an axle to be directly installed in a vehicle.

DETAILED DESCRIPTION

Figure 1:
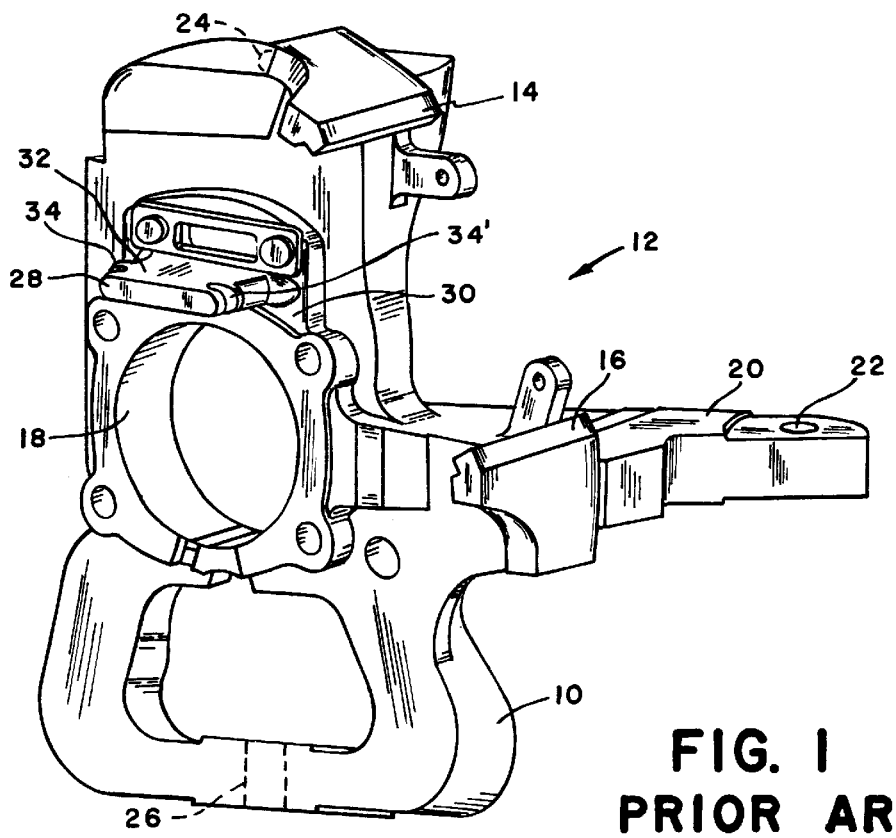
FIG. 1 is a perspective view of a prior art suspension/steering knuckle for a vehicle.

FIG. 1 illustrates a cast knuckle 12 which includes a pair of opposing arms 14 and 16 for receiving friction pads of a service disc brake of a type disclosed in U.S. Pat. No. 5,180,037, an axial opening 18 for receiving a wheel bearing and axle shaft, an arm 20 which is substantially perpendicular to the axial opening 18 with an opening 22 therein for attaching linkage associated with the steering system and radial openings 24 and 26 for receiving ball joints associated with the suspension system of a vehicle. The cast knuckle 12 has a perpendicular arcuate projection 28 extending from face 30 that functions as an anchor post 32 for an emergency drum brake for a vehicle as disclosed in U.S. Pat. No. 5,180,037. The cast knuckle 12 is attached to the suspension system and steering linkage during the manufacture of a vehicle and a backing plate for an emergency or park brake is mounted on the cast knuckle 12 such that an arcuate projection 32 extending through an opening therein. A first brake shoe is mounted on the backing plate by a first pin with a first end located in guide slot 34 on projection 32 and a second brake shoe is mounted on the backing plate by a second pin with a first end located in guide slot 34' on projection 32. The first brake shoe has a second end connected to an adjuster and the second brake shoe has a second end connected to the adjuster. The first ends of the first and second brake shoes are brought into engagement with an actuator of which U.S. Pat. No. 5,957,247 is typical and the second ends are brought into engagement with the adjuster by springs connected to the first and second shoes. The backing plate is now secured to cast knuckle 12 by bolts and a bearing located in opening 18. A wheel hub is connected to an axle which extends through a bearing located in the opening and a rotor is attached to the wheel hub. Thereafter, a caliper is attached to the cast knuckle 12 such that disc brake pads rest on arms 14 and 16 to complete the assembly.

From the time the cast knuckle 12 is removed from its mold, during any shaping of surfaces thereon as required by specific requirements associated of the disc brake, axle, axle tube, axle bearing, steering assembly, suspension system and backing plate for the drum brake and until the other components of the drum brake are actually assembled thereon it is possible to mar, bend, crack, scratch or completely break off projection 32. Unfortunately, if projection 32 is damaged, the entire cast knuckle 12 may have to be scrapped resulting in undesirable waste.

Figure 2:
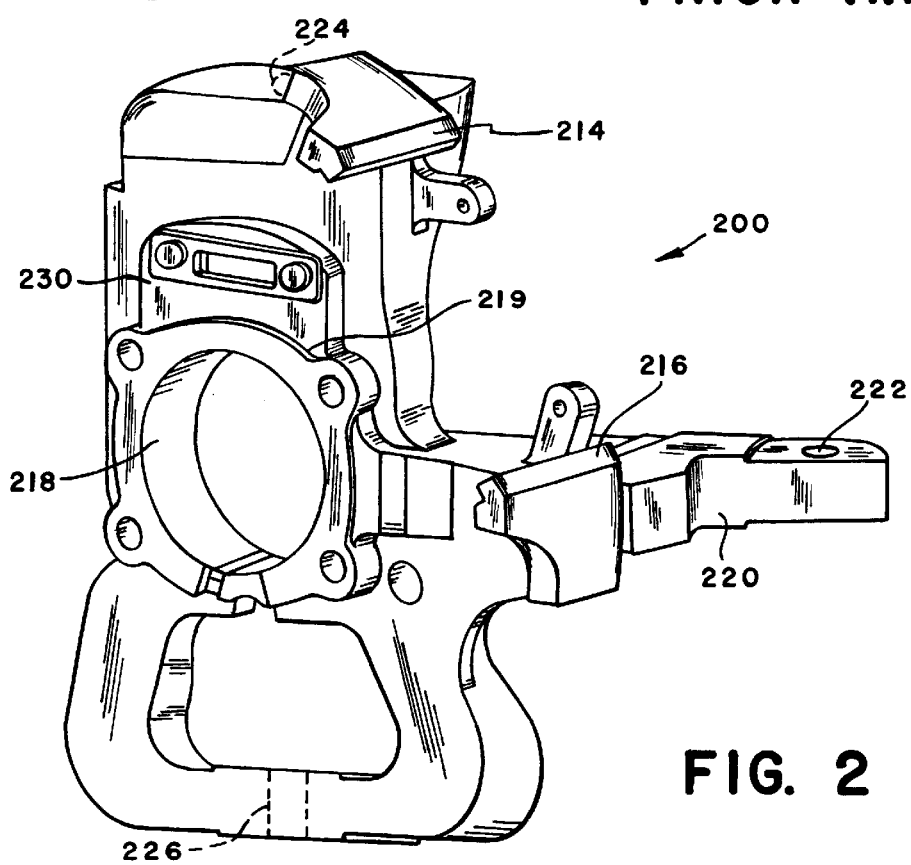
FIG. 2 is a perspective view of a suspension/steering knuckle for a vehicle made according to the present invention.

The present invention overcomes the need for scrapping a cast knuckle 12 caused by damage to a projection 32 which is designed to be used as an anchor post for a drum-in-hat park brake by removing the projection 32 from the cast knuckle 12 to define a cast knuckle 200 as shown in FIG. 2.

The cast knuckle 200 has a substantially flat surface 230 adjacent to axial opening 218. The cast knuckle 200 includes an integral pair of opposing arms 214 and 216 for receiving friction pads 233,233' of a service disc brake, an axial opening 218 for receiving a wheel bearing housing 320, an arm 220 which is substantially perpendicular to the axial opening 218 with an opening 222 for attaching a linkage associated with the steering system and radial openings 224 and 226 for receiving ball joints associated with the suspension system of the vehicle. Surface 230 has flange 219 which surrounds axial opening 218 but it should be clear surface it does not have a projection or anchor for use in a parking brake which would be subjected to damage during shipping to a location for assembly onto a vehicle.

Figure 3:
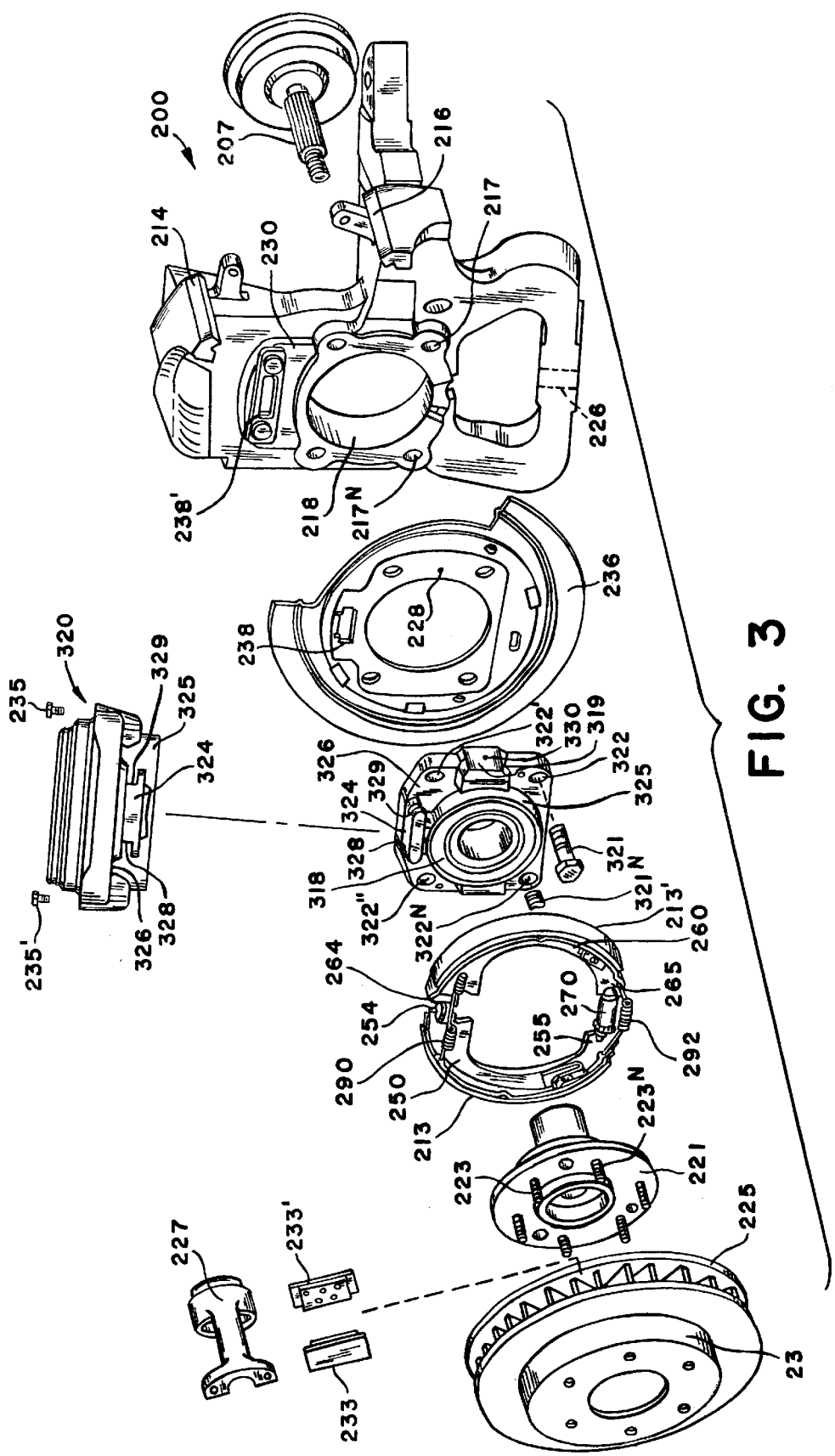
FIG. 3 is an exploded perspective view of an axle, the suspension/steering knuckle of FIG. 2, a backing plate, a wheel bearing housing, brake shoes, a hub and a rotor which form a corner assembly for a vehicle.
Figure 4:
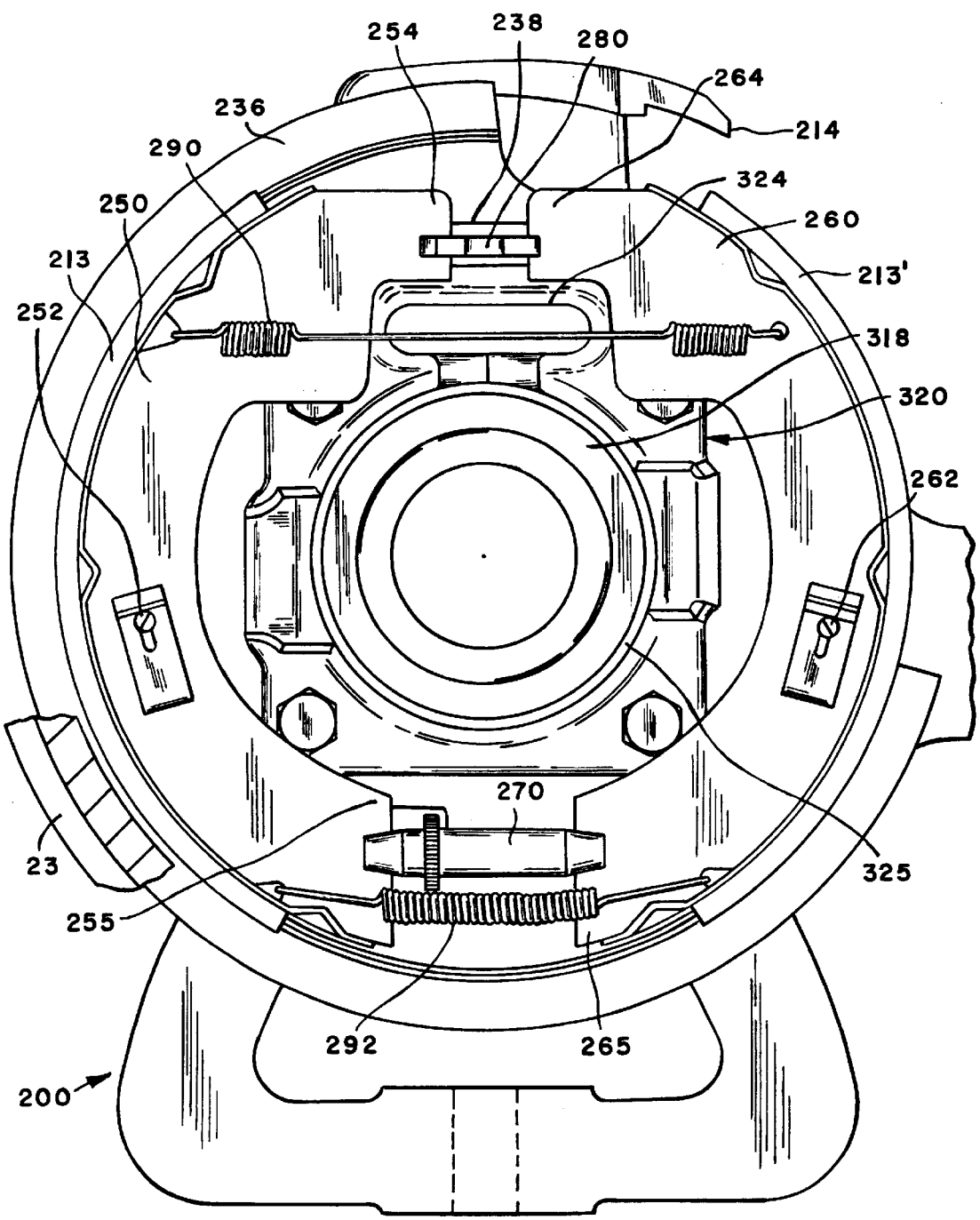
FIG. 4 is a front view of the backing plate, wheel bearing housing and brake shoes attached to the suspension/steering knuckle of FIG. 2.

The corner unit 10 is shown in a perspective installation sequence in FIG. 3 and assembled in FIG. 4. The corner unit 10 includes a backing plate 236 for a resulting emergency or park brake. The backing plate 236 is mounted on cast knuckle 200 by a plurality of bolts 321,321', ... 321$^n$ which extend through openings 322,322', ... 322$^n$ in a wheel bearing housing 320 and openings 217,217', ... 217$^n$ in the cast knuckle 200. A first brake shoe 250 which is mounted on the backing plate 236 by a first pin 252 has a first end 254 located in guide slot 328 on projection 324 of wheel bearing housing 320 while a second brake shoe 260 which is mounted on the backing plate 236 by a second pin 262 has a first end 264 located in guide slot 329 on projection 324 of wheel bearing housing 320. The first brake shoe 250 has a second end 255 that is connected to an adjuster 270 while the second brake shoe 260 has a second end 265 that is connected to the adjuster 270. The first ends 254 and 264 of the first 250 and second 260 brake shoes are brought into engagement with an actuator 280 and the second ends 255 and 265 are brought into engagement with adjuster 270 by springs 290,292 in a manner as disclosed in U.S. Pat. No. 5,957,247 prior to fixing the backing plate 236 to cast knuckle 200. A wheel hub 221 is connected to axle 207 that extends through bearing 318 and a rotor 225 is attached to the wheel hub 221. Thereafter, caliper 227 is attached to the cast knuckle 200 such that friction pads 233 and 233' of the service brake rest on arms 214 and 216 to complete the assembly.

The wheel bearing housing 320 as shown in more particular detail in FIGS. 3 and 4, has a substantially rectangular shape and is made of high strength steel with an axial opening which receives a wheel bearing 318. Housing 320 has a plurality of holes 322,322', ... 322$^n$ which are located adjacent the corners, a peripheral flange 325 which surrounds the axial opening, an arcuate projection 324 that extends from face 326 and is centered between the hole 322' and a hole 322" with first 328 and second 329 radial slots thereon and an indexing mark 330 located on face 319. Indexing mark 330 is designed to provide orientation for a feature 228 on backing plate 236 to define or locate the wheel bearing housing 320 with respect to backing plate 236. The wheel bearing housing 320 is secured to the backing plate 236 by a plurality of screws 235, 235', such that the arcuate projection 324 is positioned adjacent opening 238 in backing plate 236 and opening 238' in the cast knuckle 200 which receives a lever associated with an actuator 280. Thereafter, a first brake shoe 250 is mounted on the backing plate 236 by a first pin 252 such that a first end 254 is located in radial guide slot 328 on projection 324 and a second brake shoe 260 is mounted on the backing plate 236 by a second pin 262 such that a first end 264 is located in radial guide slot 329 on projection 324. The first brake shoe 250 has a second end 255 which is connected to an adjuster 270 while the second brake shoe 260 has a second end 265 which is connected to the adjuster 270. The first ends 254 and 264 of the first 250 and second 260 brake shoes are brought into engagement with an actuator 280 and the second ends 255 and 265 are brought into engagement with adjuster 270 by springs 290,292 in a manner as disclosed in U.S. Pat. No. 5,957,247. The wheel bearing housing 320 is now fixed to a cast knuckle 200 by a plurality of bolts 321,321', ... 321$^n$ that extend through corresponding holes 322,322', ... 322$^n$ in the cast knuckle 200. Wheel bearing housing 320 forms an outer race for the bearing 318 for axle 207 of the vehicle. The wheel hub 221 is thereafter connected to axle 207 that extends through bearing 218. Subsequently, rotor 225 is attached to the wheel hub 221 by bolts 223,223', ... 223$^n$. A caliper 227 is now attached to the cast knuckle 200 such that brake pads 233,233' rest on arms 214 and 216 to complete the assembly of the corner unit for a vehicle.

Mode of Operation

In response to an input force actuator 280 moves the first engagement end 254,264 of the first and second brake shoes 250 and 260 in a linear direction to bring friction pads 213,213' thereon into engagement with a drum 23 defined by the hat portion of rotor 225. The engagement of the friction pads 213,213' with drum 23 causes the first 250 and second 260 brake shoes to rotate and bring one of the first engagement ends 254,264 into contact with the anchor post defined by arcuate projection 324. The arcuate projection 324 provides resistance to the rotation of the first 250 and second 260 brake shoes to effect a corresponding brake application. The arcuate projection 324 provides a direct link to a fixed support (cast knuckle 200) in the vehicle to resist rotative torque developed through the engagement of brake or friction pads 213,213'.

The rotational direction of rotor 225 defines which engagement end 254,264 moves away from the arcuate projection 324 during a brake application. The amount of clearance between the friction pads and drum 23 and correspondingly the distance engagement end 254,264 moves away from the anchor post defined by arcuate projection 324, can be manually adjusted by turning wheel of adjuster 270 which is of a type as disclosed in U.S. Pat. No. 5,480,010. It is desirable to have sufficient clearance to prevent engagement when no input force is applied to actuator 280 but not an extreme amount of clearance that would require actuator 280 to move the brake shoes 250 and 260 a great distance before engagement. Since this adjustment is manually performed, a rule for adjustment might be when actuator 280 must be moved more than one half of its maximum stroke, the distance between the second engagement end 255,265 should be adjusted.

We claim:

1. A drum-in-hat park brake assembly for a rear corner of vehicle having first and second brake shoes retained on a backing plate by first and second pins, said backing plate being fixed to a knuckle that is fixed to a suspension system and connected by linkage to a steering assembly of a vehicle, each of said first and second brake shoes having a first engagement end and a second engagement end, said first engagement end of each of said first and second brake shoes being aligned on said backing plate by an anchor post, said second engagement end of each of said first and second brake shoes being selectively spaced apart by an adjuster mechanism, spring means for urging said first and second brake shoes toward said anchor post and said adjuster mechanism, and an actuator assembly connected to said first engagement end of said first and second brake shoes and upon receiving an input force moving first and second friction pads associated with said first and second brake shoes into engagement with a drum to effect a brake application, said drum-in-hat being further characterized by said anchor being defined by an arcuate projection that extends from a face on a wheel bearing housing for an axle of the vehicle, said wheel bearing housing having a substantially rectangular shape with a plurality of holes located at adjacent corners, a peripheral flange that surrounds an axial opening and an indexing mark, said arcuate projection being centered and aligned on said face between first and second holes of said plurality of holes and having first and second slots for respectively receiving said first and second engagement end of said first and second brake shoes, said wheel bearing housing being connected to said backing plate by a plurality of screws to align said indexing mark with a corresponding feature on said backing plate such that said arcuate projection is positioned adjacent a first actuator opening in said backing plate, said wheel bearing housing being fixed to the knuckle by a plurality of bolts that extend through said holes to position said arcuate projection adjacent a second actuator opening in said knuckle and an actuator that extends through said first and second actuator openings to directly engage said first engagement end of each of said first and second brake shoes, said actuator providing said first engagement end with a force to move friction pads on said first and second brake shoes into engagement with a drum to effect a brake application to develop resistive torque to rotation of said drum, said resistive torque being directly transmitted from said anchor to the knuckle by way of said plurality of bolts during the brake application.

2. In the drum-in-hat park brake assembly recited in claim 1 wherein said wheel bearing housing forms an outer race for a wheel bearing of the vehicle and has a cylindrical peripheral surface that extends through said opening in said backing plate with a shoulder thereon that engages said backing plate to hold said backing plate flat against said knuckle.

\* \* \* \* \*